(12) United States Patent
Noda

(10) Patent No.: US 12,124,014 B2
(45) Date of Patent: Oct. 22, 2024

(54) IMAGING LENS AND IMAGING APPARATUS

(71) Applicant: FUJIFILM Corporation, Tokyo (JP)

(72) Inventor: Taiga Noda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/635,352

(22) Filed: Apr. 15, 2024

(65) Prior Publication Data

US 2024/0280790 A1  Aug. 22, 2024

Related U.S. Application Data

(60) Continuation of application No. 18/352,991, filed on Jul. 14, 2023, now Pat. No. 11,988,818, which is a
(Continued)

(30) Foreign Application Priority Data

Mar. 1, 2017  (JP) .................................. 2017-038049

(51) Int. Cl.
  *G02B 13/00*  (2006.01)
  *G02B 7/04*  (2021.01)
  (Continued)

(52) U.S. Cl.
  CPC ........... *G02B 13/0045* (2013.01); *G02B 7/04* (2013.01); *G02B 9/64* (2013.01); *G02B 15/22* (2013.01)

(58) Field of Classification Search
  CPC ........ G02B 13/0045; G02B 7/04; G02B 9/64; G02B 15/22
  See application file for complete search history.

(56) References Cited

U.S. PATENT DOCUMENTS 9,291,799 B2 * 3/2016 Amanai ................. G02B 13/04
10,591,702 B2 3/2020 Noda
(Continued)

FOREIGN PATENT DOCUMENTS

CN 102819092 A 12/2012
CN 104101992 A 10/2014
(Continued)

OTHER PUBLICATIONS

An Office Action mailed by the Japanese Patent Office on Jan. 7, 2020, which corresponds to Japanese Patent Application No. 2017-038049 and is related to U.S. Appl. No. 15/902,309; with English language translation.
(Continued)

*Primary Examiner* — James C. Jones
(74) *Attorney, Agent, or Firm* — Studebaker & Brackett PC

(57) ABSTRACT

The imaging lens consists of, in order from an object side, a first lens group having a negative refractive power, a second lens group having a positive refractive power, and a third lens group having a negative refractive power, and is configured such that, during focusing, the first lens group and the third lens group remain stationary with respect to an image plane, the second lens group moves in the direction of an optical axis, the first lens group includes a first-a negative lens and a first-b negative lens successively in order from a position closest to the object side, and that the second lens group includes an aperture stop that moves integrally with the second lens group during focusing.

20 Claims, 10 Drawing Sheets

EXAMPLE 1

Related U.S. Application Data continuation of application No. 17/817,307, filed on Aug. 3, 2022, now Pat. No. 11,747,599, which is a continuation of application No. 16/784,079, filed on Feb. 6, 2020, now Pat. No. 11,442,253, which is a division of application No. 15/902,309, filed on Feb. 22, 2018, now Pat. No. 10,591,702.

(51) Int. Cl.
*G02B 9/64* (2006.01)
*G02B 15/22* (2006.01)

(56) References Cited

U.S. PATENT DOCUMENTS

| | | |
|---|---|---|
| 2012/0314306 A1 | 12/2012 | Sunaga |
| 2014/0300781 A1 | 10/2014 | Yamasaki |
| 2014/0368926 A1 | 12/2014 | Suzuki |
| 2016/0131878 A1 | 5/2016 | Nomura |

FOREIGN PATENT DOCUMENTS

| | | |
|---|---|---|
| JP | H06-300972 A | 10/1994 |
| JP | H11-211985 A | 8/1999 |
| JP | 3541983 B2 | 7/2004 |
| JP | 2009-098200 A | 5/2009 |
| JP | 2013-029658 A | 2/2013 |
| JP | 2015-001641 A | 1/2015 |
| JP | 5716569 B2 | 5/2015 |
| JP | 5788257 B2 | 9/2015 |

OTHER PUBLICATIONS

An Office Action mailed by China National Intellectual Property Administration on Feb. 3, 2021, which corresponds to Chinese U.S. Appl. No. 16/784,079.1 and is related to U.S. Appl. No. 16/784,079; with English language translation.

* cited by examiner

EXAMPLE 1

EXAMPLE 2

EXAMPLE 3

EXAMPLE 4

EXAMPLE 5

EXAMPLE 6

IMAGING LENS AND IMAGING APPARATUS

CROSS REFERENCE TO RELATED APPLICATIONS

The present application is a Continuation of U.S. patent application Ser. No. 18/352,991 filed on Jul. 14, 2023, which is a Continuation of U.S. patent application Ser. No. 17/817,307 filed on Aug. 3, 2022, which is a Continuation of U.S. patent application Ser. No. 16/784,079 filed Feb. 6, 2020, which is a Divisional of U.S. patent application Ser. No. 15/902,309 filed Feb. 22, 2018, which claims priority under 35 U.S.C. § 119 to Japanese Patent Application No. 2017-038049 filed on Mar. 1, 2017. The above application is hereby expressly incorporated by reference, in its entirety, into the present application.

BACKGROUND OF THE INVENTION

1. Field of the Invention

The present invention relates to an imaging lens which is particularly suitable for a digital camera, a lens interchangeable digital camera, a motion-picture camera or the like, and an imaging apparatus including this imaging lens.

2. Description of the Related Art

Imaging lenses which are used in a digital camera, a lens interchangeable digital camera, a motion-picture camera, or the like, imaging lenses disclosed in JP5788257B, JP5716569B, and JP3541983B are known.

SUMMARY OF THE INVENTION

In the imaging lenses as stated above, a small-sized single-focus lens is required. Particularly, in a camera having no mirror box having been called a so-called mirrorless camera in recent years, a lens having a short back focus and a short entire length is desired. In addition, the number of imaging pixels of a camera increases, and a higher degree of aberration correction is required.

Regarding such a task, the imaging lens of JP5788257B has a long back focus and a long entire lens length, and thus has a problem in that it is difficult to achieve a reduction in size. In addition, the imaging lenses of JP5716569B and JP3541983B have large astigmatism or chromatic aberration, and have a problem in that it is difficult to obtain high resolution performance.

The present invention has been contrived in view of such circumstances, and an object thereof is to provide an imaging lens which has a short back focus and a short entire lens length and in which various aberrations are satisfactorily corrected, and an imaging apparatus including this imaging lens.

According to the present invention, there is provided an imaging lens comprising, in order from an object side: a first lens group having a negative refractive power; a second lens group having a positive refractive power; and a third lens group having a negative refractive power, wherein during focusing, the first lens group and the third lens group remain stationary with respect to an image plane, and the second lens group moves in a direction of an optical axis, the first lens group includes a first-a negative lens and a first-b negative lens successively in order from a position closest to the object side, and the second lens group includes a stop that moves integrally with the second lens group during focusing.

In the imaging lens of the present invention, it is preferable that a surface of the second lens group closest to the object side has a shape convex toward the object side.

In addition, in a case where an Abbe number of the first-b negative lens in a d line is set to vd1b, and an Abbe number of the first-a negative lens in the d line is set to vd1a, it is preferable to satisfy the following Conditional Expression (1), and more preferable to satisfy the following Conditional Expression (1-1).

$$20 < vd1b - vd1a < 56 \quad (1)$$

$$24 < vd1b - vd1a < 53 \quad (1\text{-}1)$$

In addition, it is preferable that the first lens group includes a positive lens at a position closest to an image side.

In addition, in a case where an Abbe number of the first-b negative lens in a d line is set to vd1b, and an Abbe number of the positive lens of the first lens group closest to an image side in the d line is set to vd1gp, it is preferable to satisfy the following Conditional Expression (2), and more preferable to satisfy the following Conditional Expression (2-1).

$$20 < vd1b - vd1gp < 58 \quad (2)$$

$$24 < vd1b - vd1gp < 55 \quad (2\text{-}1)$$

In addition, in a case where a curvature radius of a surface of the second lens group closest to the object side is set to R2g1, and a focal length of the first lens group is set to f1, it is preferable to satisfy the following Conditional Expression (3), and more preferable to satisfy the following Conditional Expression (3-1).

$$-1.2 < R2g1/f1 < -0.1 \quad (3)$$

$$-0.9 < R2g1/f1 < -0.2 \quad (3\text{-}1)$$

In addition, in a case where a composite focal length of lenses toward the object side from the stop in the second lens group is set to f2gf, and a composite focal length of lenses toward an image side from the stop in the second lens group is set to f2gr, it is preferable to satisfy the following Conditional Expression (4), and more preferable to satisfy the following Conditional Expression (4-1).

$$0.4 < f2gf/f2gr < 1.5 \quad (4)$$

$$0.5 < f2gf/f2gr < 1.3 \quad (4\text{-}1)$$

In addition, it is preferable that the second lens group includes a positive lens at a position closest to the object side.

In addition, it is preferable that a configuration of the second lens group toward the object side from the stop consists of a positive lens, a positive lens, and a negative lens in order from the object side.

In addition, it is preferable that a configuration of the second lens group toward an image side from the stop consists of a negative lens, a positive lens, and a positive lens in order from the object side.

In addition, in a case where a focal length of the first-a negative lens is set to f1a, and a focal length of the first lens group is set to f1, it is preferable to satisfy the following Conditional Expression (5), and more preferable to satisfy the following Conditional Expression (5-1).

$$0.3 < f1a/f1 < 1.1 \quad (5)$$

$$0.4 < f1a/f1 < 0.9 \quad (5\text{-}1)$$

In addition, in a case where a focal length of the first-b negative lens is set to f1b, and a focal length of the first lens group is set to f1, it is preferable to satisfy the following Conditional Expression (6), and more preferable to satisfy the following Conditional Expression (6-1).

$$0.6 < f1b/f1 < 2.2 \tag{6}$$

$$0.9 < f1b/f1 < 1.9 \tag{6-1}$$

In addition, it is preferable that the third lens group consists of a positive lens and a negative lens in order from the object side.

According to the present invention, there is provided an imaging apparatus comprising the imaging lens of the present invention described above.

Meanwhile, the term "substantially consist of ~" is intended to be allowed to include a lens having substantially no power, optical elements, other than a lens, such as a stop, a mask, cover glass, or a filter, mechanism portions such as a lens flange, a lens barrel, an imaging device, or a camera-shake correction mechanism, and the like, in addition to the things enumerated as components.

In addition, the surface shape of the lens and the sign of the refractive power thereof are assumed to be those in a paraxial region in a case where an aspherical surface is included.

According to the invention, an imaging lens consists of, in order from an object side: a first lens group having a negative refractive power; a second lens group having a positive refractive power; and a third lens group having a negative refractive power, in which during focusing, the first lens group and the third lens group remain stationary with respect to an image plane, and the second lens group moves in a direction of an optical axis, the first lens group includes a first-a negative lens and a first-b negative lens successively in order from a position closest to the object side, and the second lens group includes a stop that moves integrally with the second lens group during focusing. Therefore, it is possible to provide an imaging lens which has a short back focus and a short entire lens length and in which various aberrations are satisfactorily corrected, and an imaging apparatus including this imaging lens.

DESCRIPTION OF THE PREFERRED EMBODIMENTS

Figure 1:
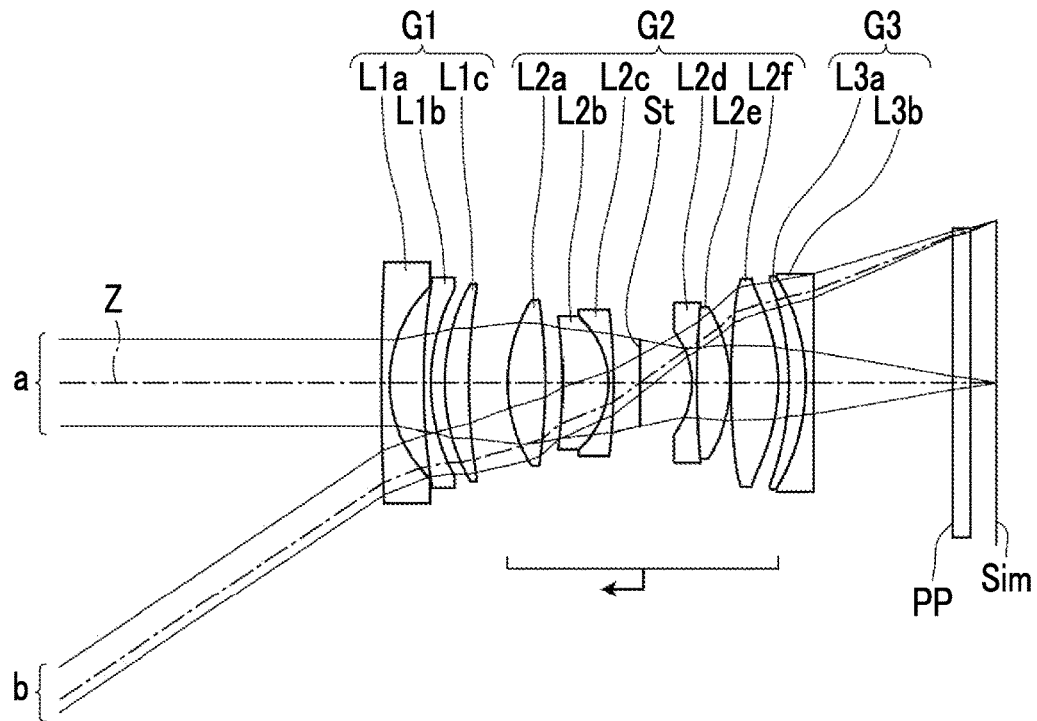
FIG. 1 is a cross-sectional view illustrating a lens configuration of an imaging lens (in common with that of Example 1) according to an embodiment of the present invention.

Hereinafter, an embodiment of the present invention will be described in detail with reference to the accompanying drawings. FIG. 1 is a cross-sectional view illustrating a lens configuration of an imaging lens according to an embodiment of the present invention. The configuration example shown in FIG. 1 is in common with a configuration of an imaging lens of Example 1 described later. In FIG. 1, the left side is an object side, the right side is an image side, and a shown aperture stop St shows its position on an optical axis Z without necessarily indicating its size or shape. In addition, in FIG. 1, an on-axis light flux a and a light flux b of the maximum angle of view are also shown together.

As shown in FIG. 1, the imaging lens of the present embodiment consists of, in order from the object side, a first lens group G1 having a negative refractive power, a second lens group G2 having a positive refractive power, and a third lens group G3 having a negative refractive power, and is configured such that, during focusing, the first lens group G1 and the third lens group G3 remain stationary with respect to an image plane Sim, and that the second lens group G2 moves in the direction of the optical axis Z.

In a case where this imaging lens is applied to an imaging apparatus, it is preferable that cover glass, a prism, and various types of filters such as an infrared cut filter or a low-pass filter are disposed between an optical system and an image plane Sim, in accordance with the configuration of a camera side having a lens mounted thereon, and thus FIG. 1 shows an example in which a parallel plate-like optical member PP oriented to these components is disposed between a lens system and the image plane Sim.

With such a configuration, it is possible to achieve an optical system which is appropriate to a mirrorless camera, and of which the back focus and entire lens length are short. In addition, the optical system is particularly effective in a reduction in the size of a wider-angle lens. Further, since aberration fluctuation during focusing is small, and an inner focus can be used, the entire length can be made invariable, which leads to a further advantage of dust-proof and drip-proof or the like.

The first lens group G1 includes a first-a negative lens L1a and a first-b negative lens L1b successively in order from a position closest to the object side. In this manner, the negative lenses are disposed at a position closest to the object side in the first lens group G1, which leads to the advantage of an increase in angle. In addition, a negative lens is further disposed adjacent to the negative lenses at a position closest to the object side, which leads to the advantage of the correction of astigmatism during an increase in angle.

The second lens group G2 includes the aperture stop St that moves integrally with the second lens group G2 during focusing. With such a configuration, it is possible to reduce the thicknesses and diameters of the first lens group G1 and the third lens group G3, and to shorten the entire lens length. In addition, such a configuration leads to the advantage of the suppression of a fluctuation in spherical aberration during focusing. Meanwhile, in a case where the aperture stop St is disposed within the first lens group G1, the diameter of the third lens group G3 increases, which leads to an undesirable result.

In the imaging lens of the present embodiment, it is preferable that the surface the second lens group G2 closest to the object side has a shape convex toward the object side. With such a configuration, spherical aberration and astigmatism can be corrected with good balance without complicating a lens system after the second lens group G2, which leads to the advantage of a reduction in the entire length.

In addition, in a case where the Abbe number of the first-b negative lens L1b in a d line is set to vd1b, and the Abbe number of the first-a negative lens L1a in the d line is set to vd1a, it is preferable to satisfy Conditional Expression (1). The ratio value is not set to be equal to or less than the lower limit of Conditional Expression (1), which leads to the advantage of the correction of on-axis chromatic aberration. The ratio value is not set to be equal to or greater than the upper limit of Conditional Expression (1), and thus it is possible to prevent a negative power difference between the first-a negative lens L1a and the first-b negative lens L1b from becoming excessively large, which leads to the advantage of the suppression of the generation of aberration or the reduction of the generation of a manufacturing variation during assembling. Meanwhile, in a case where the following Conditional Expression (1-1) is satisfied, it is possible to make characteristics more satisfactory.

$$20 < vd1b - vd1a < 56 \quad (1)$$

$$24 < vd1b - vd1a < 53 \quad (1\text{-}1)$$

In addition, it is preferable that the first lens group G1 includes a positive lens at a position closest to the image side. Such a configuration leads to the advantage of the correction of on-axis chromatic aberration.

In addition, in a case where the Abbe number of the first-b negative lens L1b in the d line is set to vd1b, and the Abbe number of the positive lens of the first lens group G1 closest to the image side in the d line is set to vd1gp, it is preferable to satisfy Conditional Expression (2). The ratio value is not set to be equal to or less than the lower limit of Conditional Expression (2), which leads to the advantage of the correction of on-axis chromatic aberration. The ratio value is not set to be equal to or greater than the upper limit of Conditional Expression (2), which leads to the advantage of the correction of lateral chromatic aberration. Meanwhile, in a case where the following Conditional Expression (2-1) is satisfied, it is possible to make characteristics more satisfactory.

$$20 < vd1b - vd1gp < 58 \quad (2)$$

$$24 < vd1b - vd1gp < 55 \quad (2\text{-}1)$$

In addition, in a case where the curvature radius of the surface of the second lens group G2 closest to the object side is set to R2g1, and the focal length of the first lens group G1 is set to f1, it is preferable to satisfy Conditional Expression (3). The ratio value is not set to be equal to or less than the lower limit of Conditional Expression (3), and thus it is possible to suppress the generation of spherical aberration. In addition, it is possible to reduce a fluctuation in spherical aberration due to focusing. The ratio value is not set to be equal to or greater than the upper limit of Conditional Expression (3), and thus it is possible to suppress the generation of astigmatism. In addition, it is possible to reduce a fluctuation in astigmatism due to focusing. Meanwhile, in a case where the following Conditional Expression (3-1) is satisfied, it is possible to make characteristics more satisfactory.

$$-1.2 < R2g1/f1 < -0.1 \quad (3)$$

$$-0.9 < R2g1/f1 < -0.2 \quad (3\text{-}1)$$

In addition, in a case where the composite focal length of lenses toward the object side from the aperture stop St in second lens group G2 is set to f2gf, and the composite focal length of lenses toward the image side from the aperture stop St in the second lens group G2 is set to f2 gr, it is preferable to satisfy Conditional Expression (4). The ratio value is not set to be equal to or less than the lower limit of Conditional Expression (4), and thus it is possible to prevent a power difference between before and after the aperture stop St from becoming larger, and to suppress the generation of spherical aberration. The ratio value is not set to be equal to or greater than the upper limit of Conditional Expression (4), and thus it is possible to reduce the back focus and the entire lens length, which leads to the advantage of a reduction in its size. Meanwhile, in a case where the following Conditional Expression (4-1) is satisfied, it is possible to make characteristics more satisfactory.

$$0.4 < f2gf/f2gr < 1.5 \quad (4)$$

$$0.5 < f2gf/f2gr < 1.3 \quad (4\text{-}1)$$

In addition, it is preferable that the second lens group G2 includes a positive lens at a position closest to the object side. With such a configuration, it is possible to reduce the stop diameter of the aperture stop St, and this is effective in reducing the size of the second lens group G2. In addition, such a configuration leads to the advantage of the correction of spherical aberration.

In addition, it is preferable that the configuration of the second lens group G2 toward the object side from the aperture stop St consists of a positive lens, a positive lens, and a negative lens, in order from the object side. With such a configuration, even in a case where the position of the second lens group G2 fluctuates due to focusing, it is possible to satisfactorily correct spherical aberration and astigmatism.

In addition, it is preferable that the configuration of the second lens group G2 toward the image side from the aperture stop St consists of a negative lens, a positive lens, and a positive lens, in order from the object side. With such a configuration, even in a case where the position of the second lens group G2 fluctuates due to focusing, it is possible to satisfactorily correct spherical aberration and astigmatism.

In addition, in a case where the focal length of the first-a negative lens L1a is set to f1a, and the focal length of the first lens group G1 is set to f1, it is preferable to satisfy Conditional Expression (5). The ratio value is not set to be equal to or less than the lower limit of Conditional Expression (5), and thus it is possible to prevent the negative power of the first-a negative lens L1a within the first lens group G1 from increasing excessively, and to suppress the generation of spherical aberration and astigmatism. The ratio value is not set to be equal to or greater than the upper limit of Conditional Expression (5), which leads to the advantage of an increase in angle and a reduction in the size of the first lens group G1 in the thickness and radial direction. Meanwhile, in a case where the following Conditional Expression (5-1) is satisfied, it is possible to make characteristics more satisfactory.

$$0.3 < f1a/f1 < 1.1 \quad (5)$$

$$0.4 < f1a/f1 < 0.9 \quad (5\text{-}1)$$

In addition, in a case where the focal length of the first-b negative lens L1b is set to f1b, and the focal length of the first lens group G1 is set to f1, it is preferable to satisfy Conditional Expression (6). The ratio value is not set to be equal to or less than the lower limit of Conditional Expression (6), and thus it is possible to prevent the negative power of the first-b negative lens L1b within the first lens group G1 from increasing excessively, and to suppress the generation of spherical aberration and astigmatism. The ratio value is not set to be equal to or greater than the upper limit of Conditional Expression (6), which leads to the advantage of an increase in angle and a reduction in the size of the first lens group G1 in the thickness and radial direction. Meanwhile, in a case where the following Conditional Expression (6-1) is satisfied, it is possible to make characteristics more satisfactory.

$$0.6 < f1b/f1 < 2.2 \quad (6)$$

$$0.9 < f1b/f1 < 1.9 \quad (6\text{-}1)$$

In addition, it is preferable that the third lens group G3 consists of a positive lens and a negative lens, in order from the object side. With such a configuration, it is possible to suppress the generation of lateral chromatic aberration and astigmatism.

In addition, it is preferable that the first lens group G1 consists of the first-a negative lens L1a, the first-b negative lens L1b, and the positive lens, in order from the object side. Such a configuration leads to the advantage of a reduction in size, an increase in angle, and the correction of astigmatism. In addition, since the first and second lenses from the object side are negative lenses, the positive lens is disposed at the third lens, which leads to the advantage of the correction of lateral chromatic aberration.

In a case where the imaging lens is used in a strict environment, it is preferable that protective multilayer film coating is performed. Further, antireflection coating for reducing ghost light in use or the like may be performed with the exception of protective coating.

In addition, in the example shown in FIG. 1, an example is shown in which the optical member PP is disposed between the lens system and the image plane Sim, but instead of disposing various types of filters, such as a low-pass filter or a filter in which a specific wavelength region is cut, between the lens system and the image plane Sim, various types of filters described above may be disposed between respective lenses, or coating having the same actions as those of various types of filters may be performed on the lens surface of any of the lenses.

Next, numerical value examples of the imaging lens of the present invention will be described.

First, an imaging lens of Example 1 will be described. FIG. 1 shows a cross-sectional view illustrating a lens configuration of the imaging lens of Example 1. Meanwhile, in FIG. 1 and FIGS. 2 to 6 corresponding to Examples 2 to 6 described later, the left side is an object side, the right side is an image side, and a shown aperture stop St shows its position on the optical axis Z without necessarily indicating its size or shape.

The imaging lens of Example 1 is configured such that the first lens group G1 is composed of three lenses of lenses L1a to L1c, the second lens group G2 is composed of six lenses of lenses L2a to L2f, and that the third lens group G3 is composed of two lenses of lenses L3a and L3b.

Table 1 shows lens data of the imaging lens of Example 1, Table 2 shows data relating to specifications, and Table 3 shows data relating to aspherical coefficients. In the following, the meanings of symbols in the tables will be described by taking an example of those in Example 1, but the same is basically true of Examples 2 to 6.

In the lens data of Table 1, the column of a surface number indicates surface numbers sequentially increases toward the image side with the surface of a component closest to the object plane side set to a first surface, the column of a curvature radius indicates curvature radii of respective surfaces, and the column of a surface spacing indicates distances on the optical axis Z between the respective surfaces and the next surfaces. In addition, the column of n indicates refractive indexes of respective optical elements in a d line (wavelength of 587.6 nm (nanometer)), the column of ν indicates Abbe numbers of the respective optical elements in the d line (wavelength of 587.6 nm (nanometer)), and the column of θgF indicates partial dispersion ratios of the respective optical elements.

Meanwhile, the partial dispersion ratio θgF is represented by the following expression.

$$\theta gF = (ng - nF)/(nF - nC)$$

Here, ng is a refractive index in a g line, nF is a refractive index in an F line, and nC is a refractive index in a C line.

Here, the sign of the curvature radius is set to be positive in a case where a surface shape is convex on the object side, and is set to be negative in a case where a surface shape is convex on the image side. Basic lens data indicates the aperture stop St and optical member PP together. In the place of a surface number of a surface equivalent to the aperture diaphragm St, a term of (diaphragm) is written together with the surface number.

The data relating to specifications of Table 2 indicates values a focal length f', an F-Number FNo, and the total angle of view 2ω.

In the lens data of Table 1, mark * is attached to the surface number of an aspherical surface, and the numerical values of a paraxial curvature radius are indicated as the curvature radius of the aspherical surface. The data relating to the aspherical coefficients of Table 3 indicates surface numbers of the aspherical surfaces and aspherical coefficients relating to these aspherical surfaces. "E±n" (n is an integer) in the numerical values of the aspherical coefficients of Table 3 means "×10$^{±n}$". The aspherical coefficients are values of respective coefficients KA and Am (m=3 to 12) in an aspherical expression represented by the following expression.

$$Zd = C \cdot h^2 / \{1 + (1 - KA \cdot C^2 \cdot h^2)^{1/2}\} + \Sigma Am \cdot h^m$$

Here, Zd is an aspherical depth (length of a vertical line drawn from a point on an aspherical surface having a height h down to a plane perpendicular to the optical axis with which the vertex of the aspherical surface is in contact), h is a height (distance from the optical axis), C is a reciprocal of the paraxial curvature radius, and KA and Am are aspherical coefficients (m=3 to 12).

For basic lens data, data relating to specifications, and data relating to aspherical coefficients, a degree is used as the unit of an angle, and mm is used as the unit of a length, but it is also possible to use other appropriate units since an optical system can be used even in a case where the optical system is magnified or reduced in proportion.

TABLE 1

Example 1·Lens Data (n and ν are based on d line)

| Surface Number | Curvature Radius | Surface Spacing | n | ν | θg,f |
|---|---|---|---|---|---|
| 1 | 435.40597 | 1.500 | 1.56732 | 42.82 | 0.57309 |
| 2 | 23.79676 | 6.080 | | | |
| 3 | 110.98748 | 1.300 | 1.48749 | 70.44 | 0.53062 |
| 4 | 34.22014 | 2.500 | | | |
| 5 | 35.40258 | 4.380 | 1.83481 | 42.72 | 0.56486 |
| 6 | 100.97490 | 6.800 | | | |
| 7 | 27.48194 | 6.750 | 1.65160 | 58.55 | 0.54267 |
| 8 | −99.97934 | 3.080 | | | |
| 9 | −88.16734 | 8.150 | 1.49700 | 81.61 | 0.53887 |
| 10 | −15.76500 | 0.910 | 1.51742 | 52.43 | 0.55649 |
| 11 | −108.42504 | 4.740 | | | |
| 12(Stop) | ∞ | 9.300 | | | |
| 13 | −14.84708 | 0.900 | 1.69895 | 30.05 | 0.60174 |
| 14 | 152.32000 | 6.010 | 1.49700 | 81.61 | 0.53887 |
| 15 | −25.00776 | 0.150 | | | |
| *16 | 117.41651 | 8.500 | 1.85400 | 40.38 | 0.56890 |
| *17 | −31.18464 | 1.890 | | | |
| 18 | −49.99927 | 3.030 | 1.85026 | 32.27 | 0.59299 |
| 19 | −36.42900 | 1.410 | 1.58144 | 40.75 | 0.57757 |
| 20 | ∞ | 25.000 | | | |
| 21 | ∞ | 3.200 | 1.51680 | 64.20 | 0.53430 |
| 22 | ∞ | 4.617 | | | |

TABLE 2

Example 1·Specification (d Line)

| | |
|---|---|
| f | 44.690 |
| FNo. | 2.88 |
| 2ω [°] | 67.8 |

TABLE 3

Example 1·Aspheric Coefficient

| Surface Number | 16 | 17 |
|---|---|---|
| KA | 1.0000000E+00 | 1.0000000E+00 |
| A3 | 0.0000000E+00 | 0.0000000E+00 |
| A4 | 2.5111094E−06 | 1.0876283E−05 |
| A5 | −8.1916033E−07 | −1.3848879E−06 |
| A6 | 3.0328098E−08 | 1.6586534E−07 |
| A7 | 4.4686427E−09 | −7.3663085E−09 |
| A8 | −2.4426688E−10 | −3.4202876E−10 |
| A9 | −1.0799226E−11 | 5.5683892E−11 |
| A10 | 6.5637730E−13 | −1.3869137E−12 |
| A11 | 1.3638985E−14 | −7.6139587E−14 |
| A12 | −5.6762959E−16 | 3.4342285E−15 |

Figure 7:
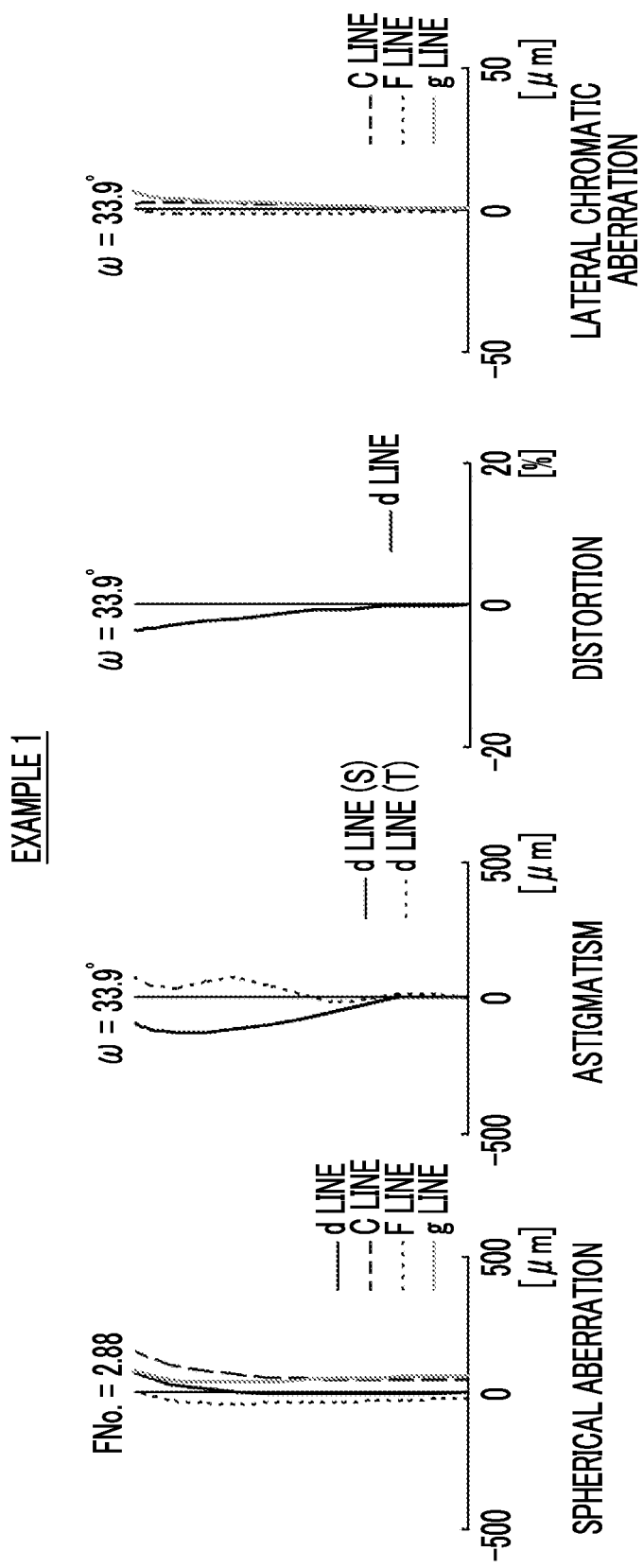
FIG. 7 is a diagram of aberrations of the imaging lens of Example 1 of the present invention.

FIG. 7 shows a diagram of aberrations of the imaging lens of Example 1. Meanwhile, spherical aberration, astigmatism, distortion, and lateral chromatic aberration in a state of being focused on an infinite object are shown in order from the left side of FIG. 7. The diagram of aberrations indicating spherical aberration, astigmatism, and distortion shows aberrations in which the d line (wavelength 587.6 nm (nanometer)) is used as a reference wavelength. In the spherical aberration diagram, aberrations relating to the d line (wavelength 587.6 nm (nanometer)), a C line (wavelength 656.3 nm (nanometer)), an F line (wavelength 486.1 nm (nanometer)), and a g line (wavelength 435.8 nm (nanometer)) are shown by a solid line, a long dashed line, a short dashed line, and a gray solid line, respectively. In the astigmatism diagram, aberrations in a sagittal direction and a tangential direction are shown by a solid line and a short dashed line, respectively. In the lateral chromatic aberration diagram, aberrations relating to the C line (wavelength 656.3 nm (nanometer)), the F line (wavelength 486.1 nm (nanometer)), and the g line (wavelength 435.8 nm (nanometer)) are shown by a long dashed line, a short dashed line, and a gray solid line, respectively. FNo. in the spherical aberration diagram means an F-Number, and ω in the other aberration diagrams means a half angle of view.

In the description of Example 1, symbols, meanings, and description methods of the respective pieces of data are the same as those in the following examples unless otherwise noted, and thus the repeated description thereof will be omitted below.

Figure 2:
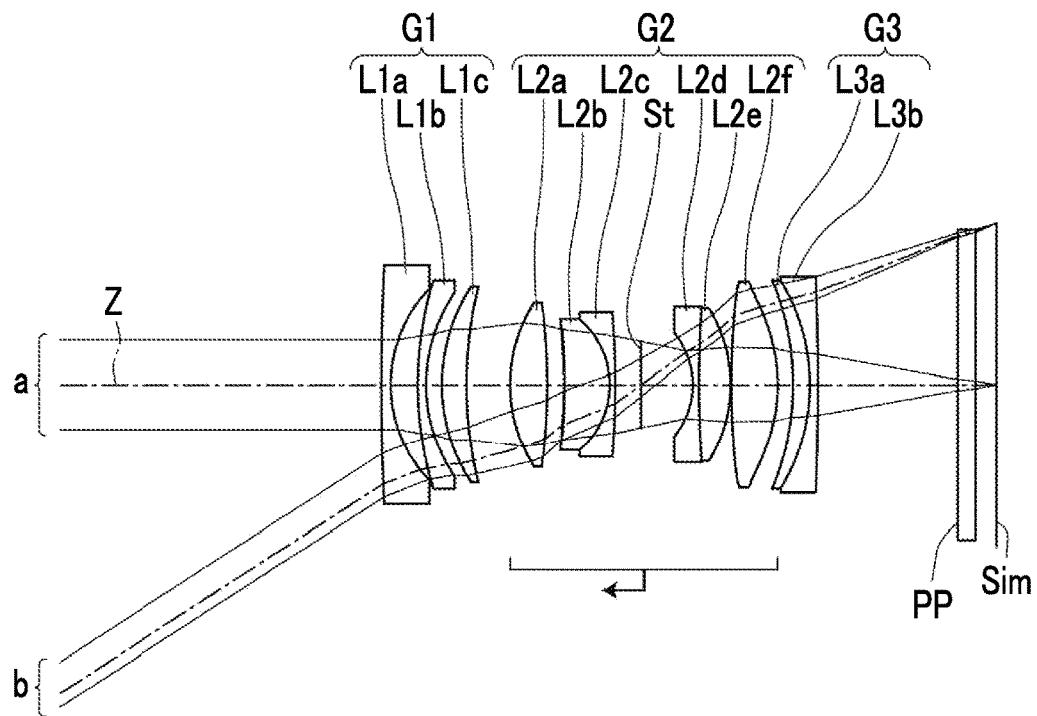
FIG. 2 is a cross-sectional view illustrating a lens configuration of an imaging lens of Example 2 of the present invention.
Figure 8:
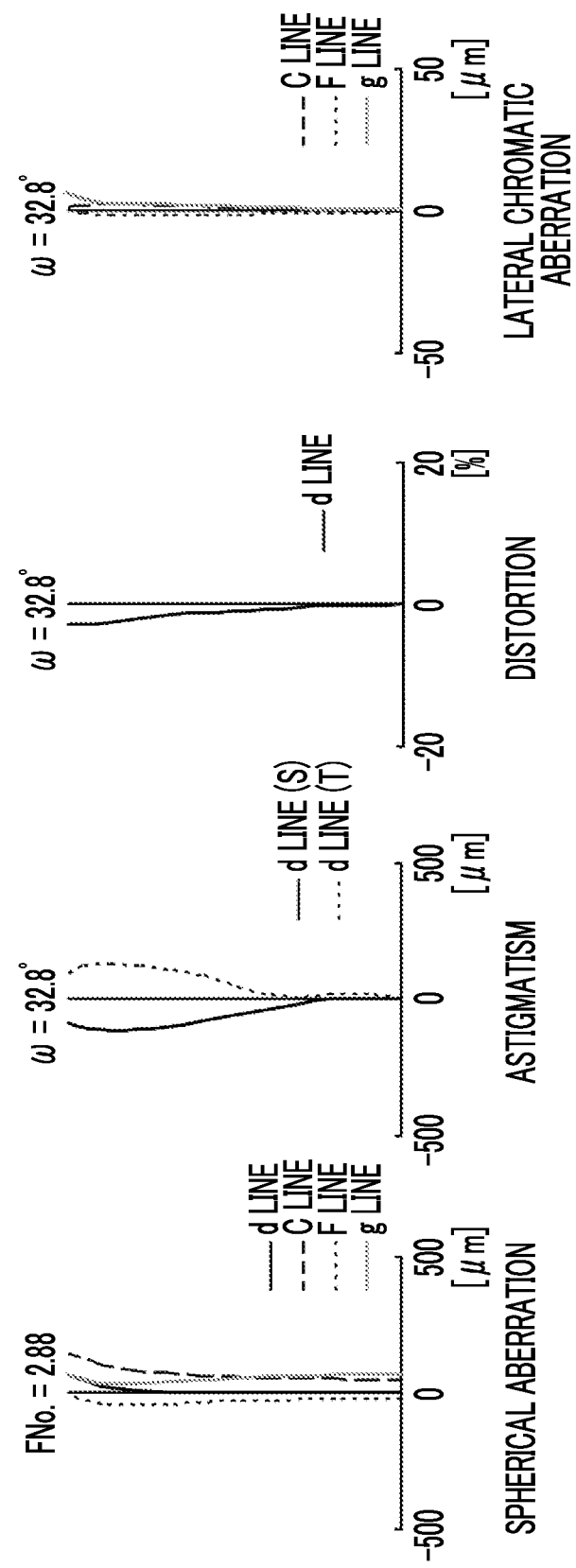
FIG. 8 is a diagram of aberrations of the imaging lens of Example 2 of the present invention.

Next, an imaging lens of Example 2 will be described. FIG. 2 shows a cross-sectional view illustrating a lens configuration of the imaging lens of Example 2. The number of lenses of each group of the imaging lens of Example 2 is the same as that in Example 1. In addition, Table 4 shows basic lens data of the imaging lens of Example 2, Table 5 shows data relating to specifications, Table 6 shows data relating to aspherical coefficients, and FIG. 8 shows a diagram of aberrations.

TABLE 4

Example 2·Lens Data (n and ν are based on d line)

| Surface Number | Curvature Radius | Surface Spacing | n | ν | θg,f |
|---|---|---|---|---|---|
| 1 | 431.05813 | 1.700 | 1.56732 | 42.82 | 0.57309 |
| 2 | 24.69861 | 4.910 | | | |
| 3 | 64.33407 | 1.500 | 1.48749 | 70.44 | 0.53062 |
| 4 | 29.22841 | 2.820 | | | |
| 5 | 32.08779 | 4.410 | 1.83481 | 42.72 | 0.56486 |
| 6 | 73.66471 | 7.660 | | | |
| 7 | 27.22487 | 6.730 | 1.65160 | 58.55 | 0.54267 |
| 8 | −105.36487 | 2.980 | | | |
| 9 | −110.28451 | 8.100 | 1.49700 | 81.61 | 0.53887 |
| 10 | −15.50600 | 1.010 | 1.51742 | 52.43 | 0.55649 |
| 11 | −153.29100 | 4.610 | | | |
| 12(Stop) | ∞ | 9.330 | | | |
| 13 | −14.55619 | 1.100 | 1.69895 | 30.05 | 0.60174 |
| 14 | 196.08000 | 5.680 | 1.49700 | 81.61 | 0.53887 |
| 15 | −26.09610 | 0.150 | | | |
| *16 | 146.07815 | 8.320 | 1.85400 | 40.38 | 0.56890 |
| *17 | −30.01494 | 2.730 | | | |
| 18 | −49.00536 | 3.020 | 1.85026 | 32.27 | 0.59299 |
| 19 | −35.93100 | 1.510 | 1.58144 | 40.75 | 0.57757 |
| 20 | −431.11403 | 25.000 | | | |
| 21 | ∞ | 3.200 | 1.51680 | 64.20 | 0.53430 |
| 22 | ∞ | 3.722 | | | |

TABLE 5

Example2·Specification (d Line)

| | |
|---|---|
| f | 46.321 |
| FNo. | 2.88 |
| 2ω [°] | 65.6 |

TABLE 6

Example 2•Aspheric Coefficient

| Surface Number | 16 | 17 |
|---|---|---|
| KA | 1.0000000E+00 | 1.0000000E+00 |
| A3 | 0.0000000E+00 | 0.0000000E+00 |
| A4 | 1.8484096E−06 | 1.0362419E−05 |
| A5 | −9.1303858E−07 | −1.4579874E−06 |
| A6 | 7.1240570E−08 | 1.8529048E−07 |
| A7 | 9.3424353E−10 | −8.3025727E−09 |
| A8 | −3.1405360E−10 | −4.0800380E−10 |
| A9 | 8.6032797E−12 | 6.0908486E−11 |
| A10 | 2.6953224E−13 | −1.3517154E−12 |
| A11 | −1.4114966E−14 | −8.2786576E−14 |
| A12 | 3.3215425E−16 | 3.4650194E−15 |

Figure 3:
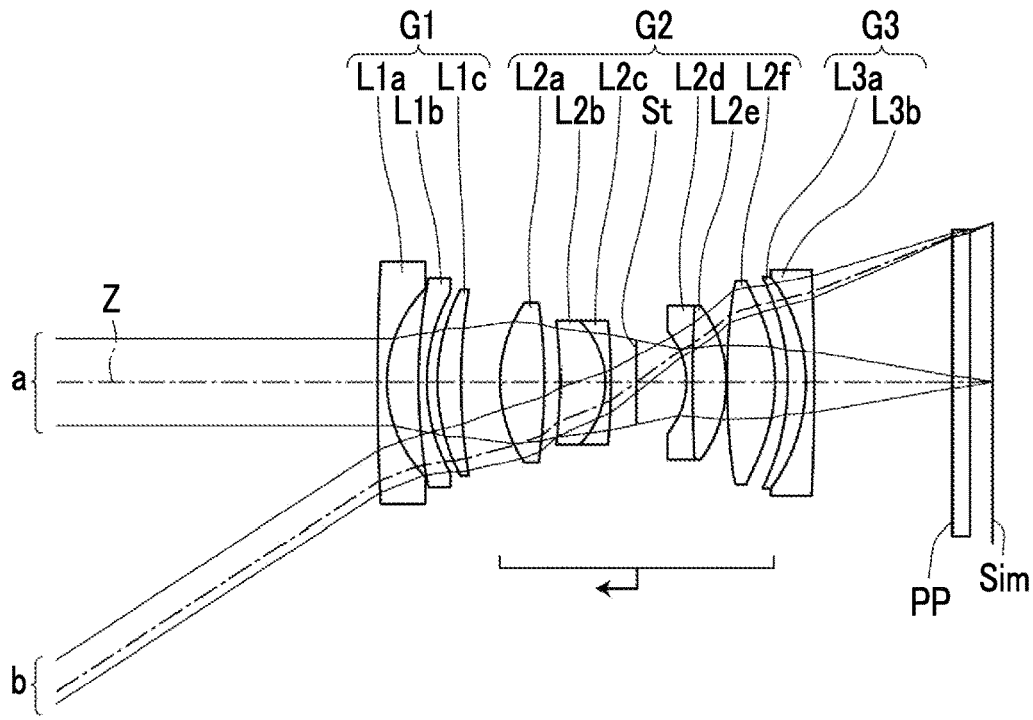
FIG. 3 is a cross-sectional view illustrating a lens configuration of an imaging lens of Example 3 of the present invention.
Figure 9:
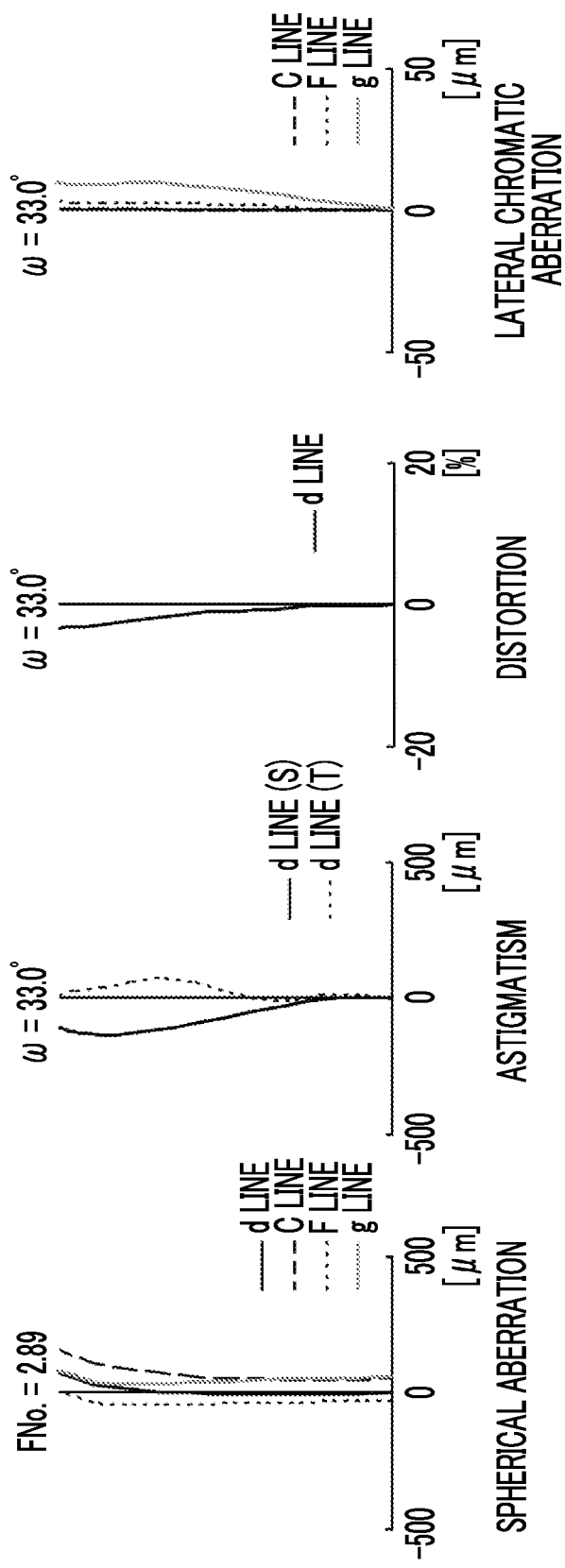
FIG. 9 is a diagram of aberrations of the imaging lens of Example 3 of the present invention.

Next, an imaging lens of Example 3 will be described. FIG. 3 shows a cross-sectional view illustrating a lens configuration of the imaging lens of Example 3. The number of lenses of each group of the imaging lens of Example 3 is the same as that in Example 1. In addition, Table 7 shows basic lens data of the imaging lens of Example 3, Table 8 shows data relating to specifications, Table 9 shows data relating to aspherical coefficients, and FIG. 9 shows a diagram of aberrations.

TABLE 7

Example 3•Lens Data (n and ν are based on d line)

| Surface Number | Curvature Radius | Surface Spacing | n | ν | θg,f |
|---|---|---|---|---|---|
| 1 | 423.39447 | 1.700 | 1.56732 | 42.82 | 0.57309 |
| 2 | 24.46063 | 5.720 | | | |
| 3 | 101.75050 | 1.500 | 1.49700 | 81.61 | 0.53887 |
| 4 | 33.86324 | 1.930 | | | |
| 5 | 36.10614 | 4.260 | 1.83481 | 42.72 | 0.56486 |
| 6 | 99.34008 | 6.970 | | | |
| 7 | 26.32312 | 8.000 | 1.65160 | 58.55 | 0.54267 |
| 8 | −105.36687 | 2.840 | | | |
| 9 | −93.85093 | 8.150 | 1.49700 | 81.61 | 0.53887 |
| 10 | −15.76500 | 1.010 | 1.51742 | 52.43 | 0.55649 |
| 11 | −120.39419 | 4.590 | | | |
| 12(Stop) | ∞ | 9.100 | | | |
| 13 | −14.26229 | 1.100 | 1.69895 | 30.05 | 0.60174 |
| 14 | 282.14000 | 6.130 | 1.49700 | 81.61 | 0.53887 |
| 15 | −23.27116 | 0.150 | | | |
| *16 | 120.59544 | 8.700 | 1.85400 | 40.38 | 0.56890 |
| *17 | −30.25035 | 2.300 | | | |
| 18 | −42.34552 | 3.270 | 1.85478 | 24.80 | 0.61232 |
| 19 | −32.27000 | 1.510 | 1.62588 | 35.70 | 0.58935 |
| 20 | −438.25596 | 25.000 | | | |
| 21 | ∞ | 3.200 | 1.51680 | 64.20 | 0.53430 |
| 22 | ∞ | 4.078 | | | |

TABLE 8

Example3•Specification (d Line)

| f | 46.290 |
|---|---|
| FNo. | 2.89 |
| 2ω [°] | 66.0 |

TABLE 9

Example 3•Aspheric Coefficient

| Surface Number | 16 | 17 |
|---|---|---|
| KA | 1.0000000E+00 | 1.0000000E+00 |
| A3 | 0.0000000E+00 | 0.0000000E+00 |
| A4 | 2.4524044E−06 | 1.0113984E−05 |
| A5 | −9.9118837E−07 | −1.3512634E−06 |
| A6 | 7.4450054E−08 | 1.5965913E−07 |
| A7 | 1.0574635E−09 | −6.1463324E−09 |
| A8 | −3.2438613E−10 | −4.2772151E−10 |
| A9 | 8.3777086E−12 | 5.3409441E−11 |
| A10 | 2.7473344E−13 | −1.0387500E−12 |
| A11 | −1.3957315E−14 | −7.7119498E−14 |
| A12 | 3.1206469E−16 | 3.0352213E−15 |

Figure 4:
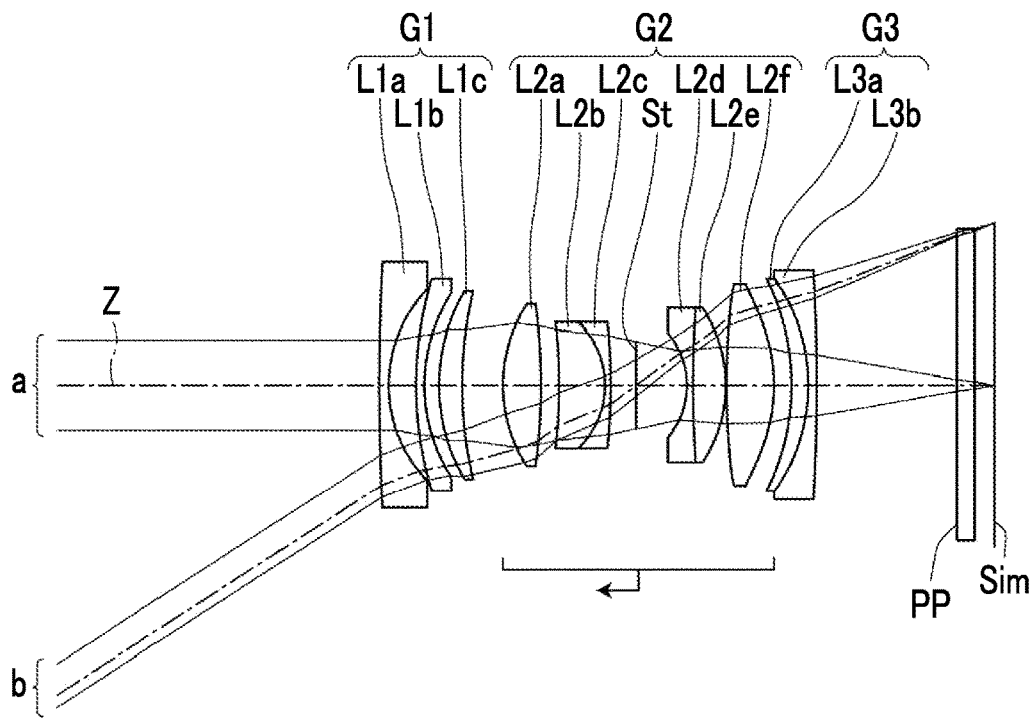
FIG. 4 is a cross-sectional view illustrating a lens configuration of an imaging lens of Example 4 of the present invention.
Figure 10:
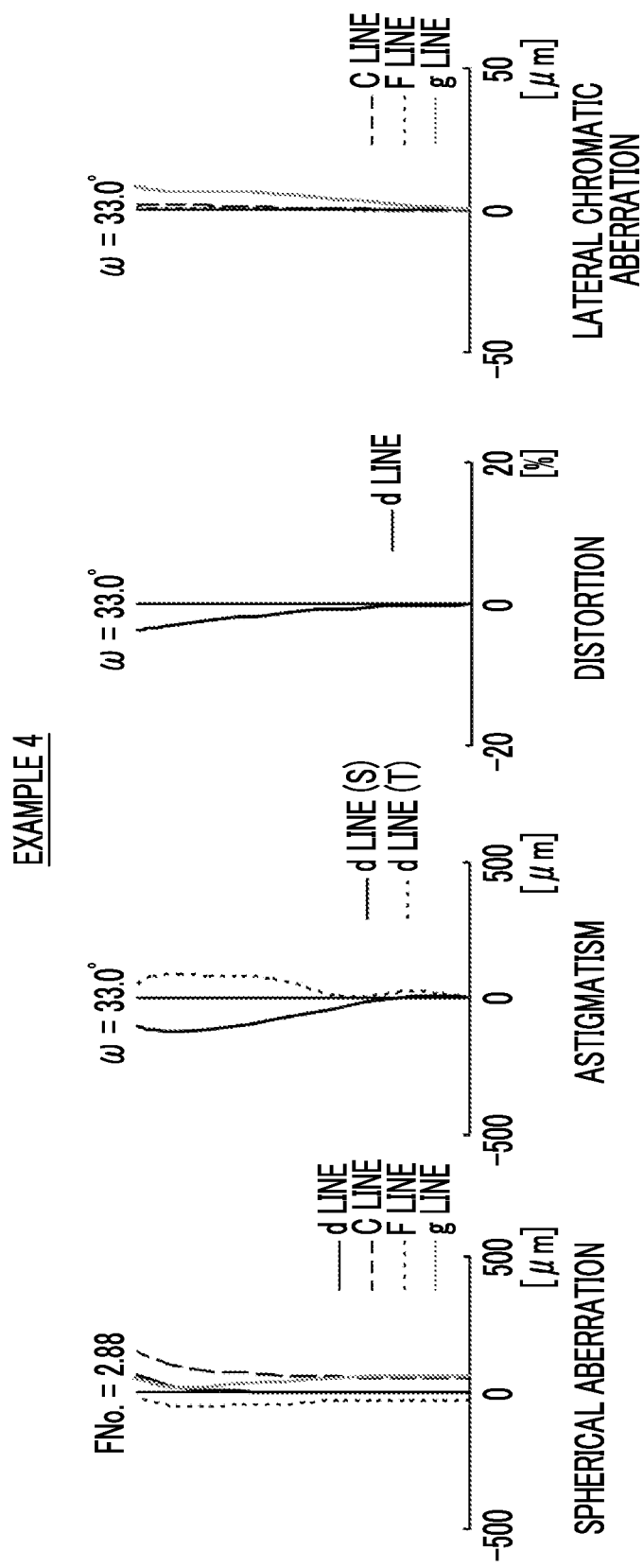
FIG. 10 is a diagram of aberrations of the imaging lens of Example 4 of the present invention.

Next, an imaging lens of Example 4 will be described. FIG. 4 shows a cross-sectional view illustrating a lens configuration of the imaging lens of Example 4. The number of lenses of each group of the imaging lens of Example 4 is the same as that in Example 1. In addition, Table 10 shows basic lens data of the imaging lens of Example 4, Table 11 shows data relating to specifications, Table 12 shows data relating to aspherical coefficients, and FIG. 10 shows a diagram of aberrations.

TABLE 10

Example 4•Lens Data (n and ν are based on d line)

| Surface Number | Curvature Radius | Surface Spacing | n | ν | θg,f |
|---|---|---|---|---|---|
| 1 | 416.72917 | 1.700 | 1.56732 | 42.82 | 0.57309 |
| 2 | 24.64555 | 4.906 | | | |
| 3 | 65.14562 | 1.500 | 1.49700 | 81.61 | 0.53887 |
| 4 | 30.43479 | 2.623 | | | |
| 5 | 33.15394 | 4.145 | 1.83481 | 42.72 | 0.56486 |
| 6 | 72.56619 | 7.322 | | | |
| 7 | 26.68456 | 6.805 | 1.65160 | 58.55 | 0.54267 |
| 8 | −109.33191 | 3.276 | | | |
| 9 | −94.02283 | 8.150 | 1.49700 | 81.61 | 0.53887 |
| 10 | −15.60925 | 1.010 | 1.51742 | 52.43 | 0.55649 |
| 11 | −110.21512 | 4.586 | | | |
| 12(Stop) | ∞ | 9.092 | | | |
| 13 | −14.41805 | 1.100 | 1.69895 | 30.13 | 0.60298 |
| 14 | 192.33358 | 5.869 | 1.49700 | 81.61 | 0.53887 |
| 15 | −24.81493 | 0.150 | | | |
| *16 | 135.38687 | 8.500 | 1.85400 | 40.38 | 0.56890 |
| *17 | −29.82799 | 3.151 | | | |
| 18 | −42.37296 | 3.064 | 1.85026 | 32.27 | 0.59299 |
| 19 | −32.31055 | 1.510 | 1.58144 | 40.75 | 0.57757 |
| 20 | −351.50130 | 25.000 | | | |
| 21 | ∞ | 3.200 | 1.51680 | 64.20 | 0.53430 |
| 22 | ∞ | 3.526 | | | |

TABLE 11

Example 4•Specification (d Line)

| f | 46.345 |
|---|---|
| FNo. | 2.88 |
| 2ω [°] | 66.0 |

TABLE 12

Example 4·Aspheric Coefficient

| Surface Number | 16 | 17 |
|---|---|---|
| KA | 1.0000000E+00 | 1.0000000E+00 |
| A3 | 0.0000000E+00 | 0.0000000E+00 |
| A4 | 1.7489866E−06 | 1.0380844E−05 |
| A5 | −8.7233527E−07 | −1.5845984E−06 |
| A6 | 7.0254484E−08 | 2.0989650E−07 |
| A7 | 5.3294379E−10 | −9.9900471E−09 |
| A8 | −2.8815370E−10 | −4.5119082E−10 |
| A9 | 9.5432233E−12 | 7.1010750E−11 |
| A10 | 1.6172816E−13 | −1.5827675E−12 |
| A11 | −1.4351072E−14 | −9.7109551E−14 |
| A12 | 4.4781065E−16 | 3.9948097E−15 |

Figure 5:
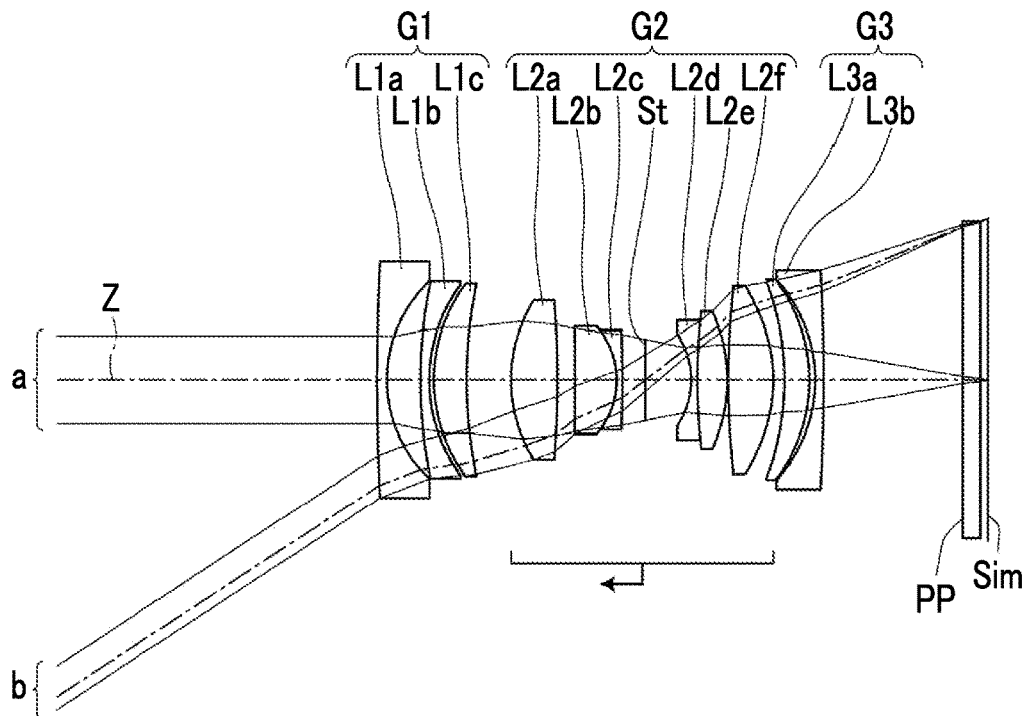
FIG. 5 is a cross-sectional view illustrating a lens configuration of an imaging lens of Example 5 of the present invention.
Figure 11:
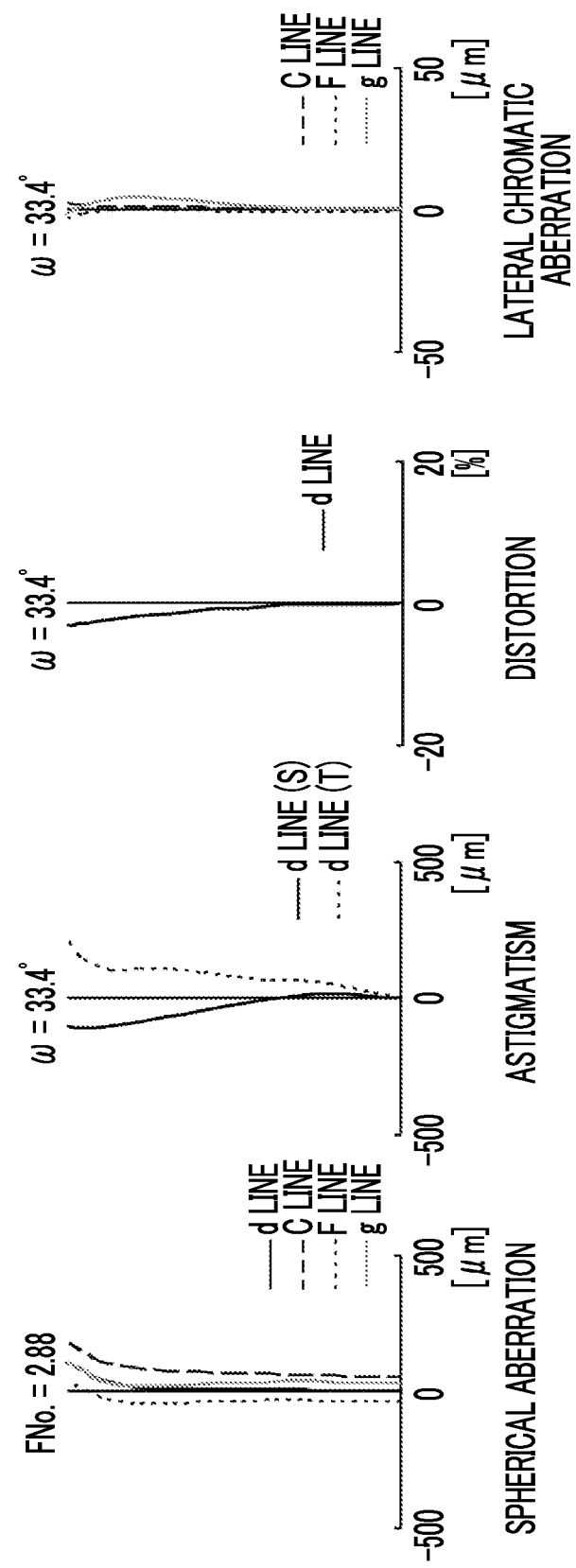
FIG. 11 is a diagram of aberrations of the imaging lens of Example 5 of the present invention.

Next, an imaging lens of Example 5 will be described. FIG. 5 shows a cross-sectional view illustrating a lens configuration of the imaging lens of Example 5. The number of lenses of each group of the imaging lens of Example 5 is the same as that in Example 1. In addition, Table 13 shows basic lens data of the imaging lens of Example 5, Table 14 shows data relating to specifications, Table 15 shows data relating to aspherical coefficients, and FIG. 11 shows a diagram of aberrations.

TABLE 13

Example 5·Lens Data (n and ν are based on d line)

| Surface Number | Curvature Radius | Surface Spacing | n | ν | θg,f |
|---|---|---|---|---|---|
| 1 | 416.72013 | 1.800 | 1.59551 | 39.24 | 0.58043 |
| 2 | 24.39567 | 6.032 | | | |
| 3 | 86.32238 | 1.600 | 1.49700 | 81.54 | 0.53748 |
| 4 | 28.86838 | 0.819 | | | |
| 5 | 28.79568 | 5.925 | 1.85150 | 40.78 | 0.56958 |
| 6 | 84.70214 | 8.003 | | | |
| 7 | 27.04352 | 8.376 | 1.65160 | 58.55 | 0.54267 |
| 8 | −172.35960 | 3.123 | | | |
| 9 | −741.03140 | 7.500 | 1.49700 | 81.54 | 0.53748 |
| 10 | −14.73849 | 1.010 | 1.51742 | 52.43 | 0.55649 |
| 11 | −253.76738 | 4.151 | | | |
| 12(Stop) | ∞ | 8.294 | | | |
| 13 | −14.59602 | 1.100 | 1.69895 | 30.05 | 0.60174 |
| 14 | 108.99296 | 5.408 | 1.49700 | 81.54 | 0.53748 |
| 15 | −29.20712 | 0.150 | | | |
| *16 | 134.31087 | 8.157 | 1.82080 | 42.71 | 0.56428 |
| *17 | −27.65827 | 1.993 | | | |
| 18 | −49.74308 | 4.552 | 1.91650 | 31.60 | 0.59117 |
| 19 | −29.39529 | 1.047 | | | |
| 20 | −26.39569 | 1.500 | 1.58144 | 40.75 | 0.57757 |
| 21 | −365.85902 | 25.000 | | | |
| 22 | ∞ | 3.200 | 1.51680 | 64.20 | 0.53430 |
| 23 | ∞ | 1.344 | | | |

TABLE 14

Example 5·Specification (d Line)

| f | 45.426 |
|---|---|
| FNo. | 2.88 |
| 2ω [°] | 66.8 |

TABLE 15

Example 5·Aspheric Coefficient

| Surface Number | 16 | 17 |
|---|---|---|
| KA | 1.0000000E+00 | 1.0000000E+00 |
| A3 | 0.0000000E+00 | 0.0000000E+00 |
| A4 | −1.9188974E−06 | 9.1742045E−06 |
| A5 | −2.0138915E−07 | −7.5344617E−07 |
| A6 | 2.3397334E−08 | 8.2589798E−08 |
| A7 | 6.6841292E−10 | −2.4229216E−09 |
| A8 | −1.0064739E−10 | −1.4929255E−10 |
| A9 | −5.2934958E−13 | 1.4997132E−11 |
| A10 | 1.8523759E−13 | −2.5550288E−13 |
| A11 | −1.0287849E−16 | −1.4624103E−14 |
| A12 | −1.1396272E−16 | 5.0254606E−16 |

Figure 6:
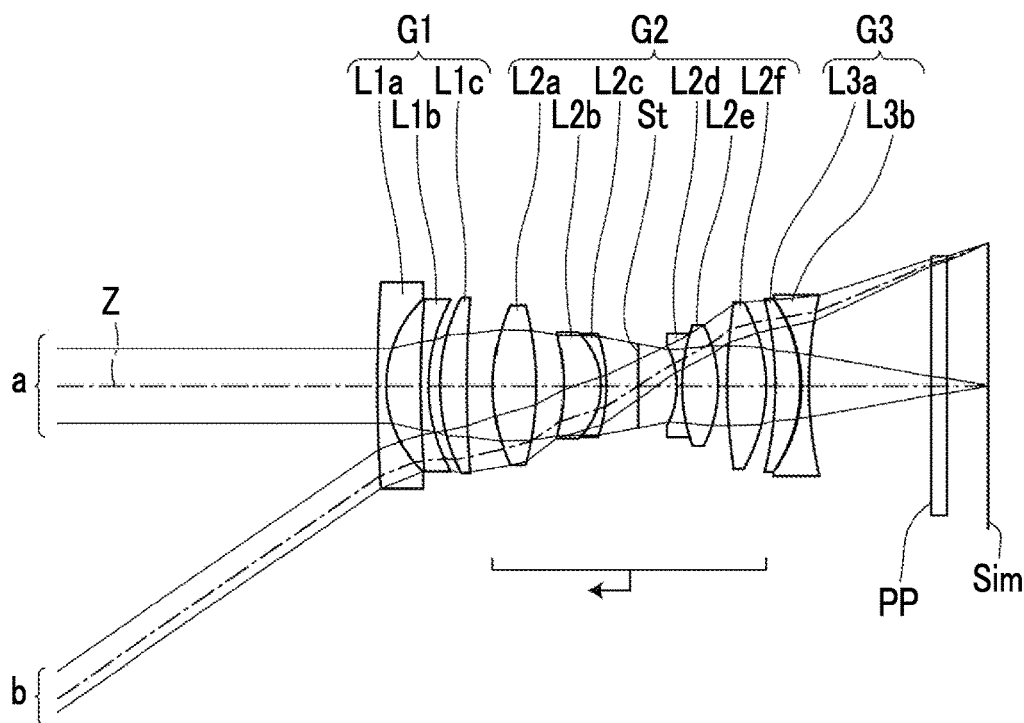
FIG. 6 is a cross-sectional view illustrating a lens configuration of an imaging lens of Example 6 of the present invention.
Figure 12:
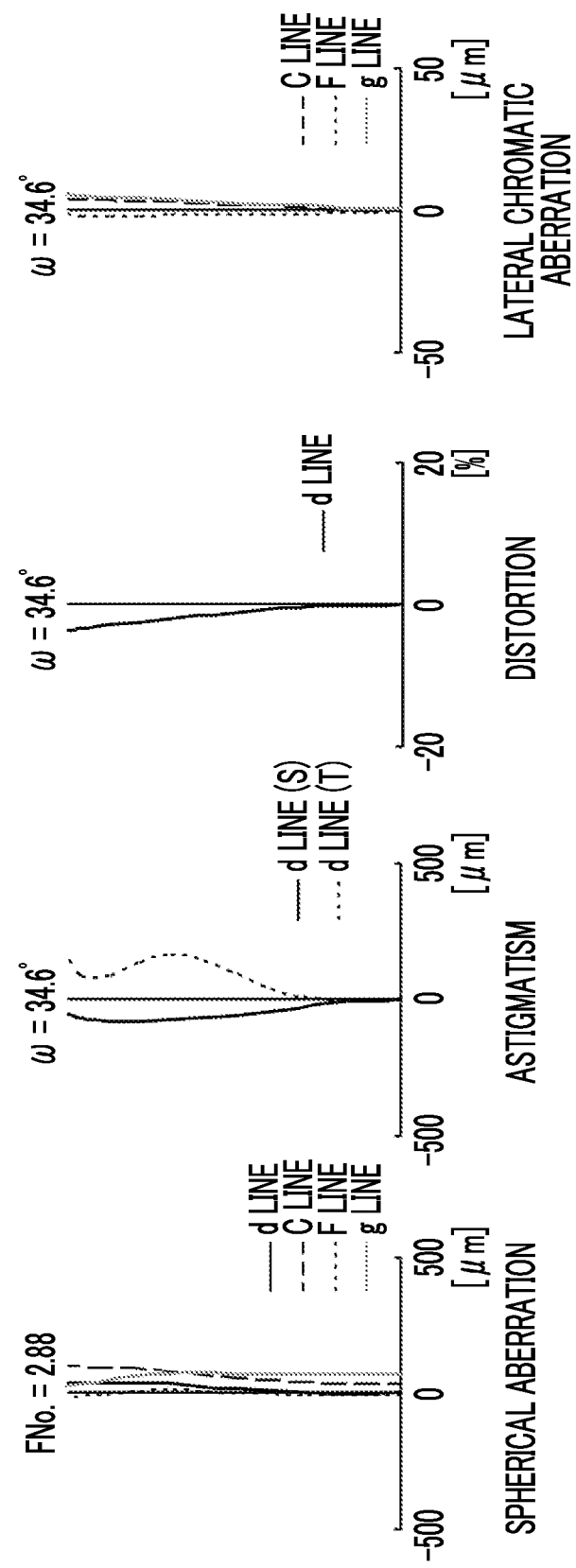
FIG. 12 is a diagram of aberrations of the imaging lens of Example 6 of the present invention.

Next, an imaging lens of Example 6 will be described. FIG. 6 shows a cross-sectional view illustrating a lens configuration of the imaging lens of Example 6. The number of lenses of each group of the imaging lens of Example 6 is the same as that in Example 1. In addition, Table 16 shows basic lens data of the imaging lens of Example 6, Table 17 shows data relating to specifications, Table 18 shows data relating to aspherical coefficients, and FIG. 12 shows a diagram of aberrations.

TABLE 16

Example 6·Lens Data (n and ν are based on d line)

| Surface Number | Curvature Radius | Surface Spacing | n | ν | θg,f |
|---|---|---|---|---|---|
| 1 | 297.48522 | 1.800 | 1.67270 | 32.10 | 0.59891 |
| 2 | 23.70498 | 7.072 | | | |
| 3 | 195.86349 | 1.600 | 1.49700 | 81.54 | 0.53748 |
| 4 | 35.36707 | 2.326 | | | |
| 5 | 38.21178 | 5.464 | 1.85025 | 30.05 | 0.59797 |
| 6 | 225.59762 | 5.234 | | | |
| 7 | 39.05808 | 8.692 | 1.60311 | 60.64 | 0.54148 |
| 8 | −60.94187 | 5.542 | | | |
| 9 | −40.17019 | 7.500 | 1.49700 | 81.54 | 0.53748 |
| 10 | −14.68018 | 1.110 | 1.51742 | 52.43 | 0.55649 |
| 11 | −32.56315 | 6.487 | | | |
| 12(Stop) | ∞ | 7.803 | | | |
| 13 | −17.53214 | 1.100 | 1.64769 | 33.84 | 0.59227 |
| 14 | 35.64481 | 7.328 | 1.49700 | 81.54 | 0.53748 |
| 15 | −26.57518 | 1.809 | | | |
| *16 | 90.03420 | 7.955 | 1.75501 | 51.16 | 0.54856 |
| *17 | −30.96775 | 1.866 | | | |
| 18 | −69.59863 | 5.081 | 1.85896 | 22.73 | 0.62844 |
| 19 | −30.46794 | 0.251 | | | |
| 20 | −29.57433 | 1.500 | 1.63980 | 34.47 | 0.59233 |
| 21 | 79.33787 | 25.000 | | | |
| 22 | ∞ | 3.200 | 1.51680 | 64.20 | 0.53430 |
| 23 | ∞ | 8.355 | | | |

TABLE 17

Example 6·Specification (d Line)

| f | 43.593 |
|---|---|
| FNo. | 2.88 |
| 2ω [°] | 69.2 |

TABLE 18

Example 6·Aspheric Coefficient

| Surface Number | 16 | 17 |
|---|---|---|
| KA | 1.0000000E+00 | 1.0000000E+00 |
| A3 | 0.0000000E+00 | 0.0000000E+00 |
| A4 | −2.2658969E−06 | 5.6556390E−06 |
| A5 | −2.5565504E−07 | −3.0325544E−07 |
| A6 | 8.3876218E−09 | 4.0416384E−08 |
| A7 | 1.4030285E−09 | −2.2980143E−09 |
| A8 | −6.0212242E−11 | −3.9204922E−11 |
| A9 | −3.0339908E−12 | 1.0815695E−11 |
| A10 | 1.6241019E−13 | −2.8838812E−13 |
| A11 | 2.3847148E−15 | −9.4789520E−15 |
| A12 | −1.2173735E−16 | 4.2240813E−16 |

Table 19 shows values corresponding to Conditional Expressions (1) to (6) of the imaging lenses of Examples 1 to 6. Meanwhile, the d line is used as a reference wavelength in all the examples, and values shown in the following Table 19 are equivalent to those at this reference wavelength.

TABLE 19

| Number | Conditional Expression | Example 1 | Example 2 | Example 3 | Example 4 | Example 5 | Example 6 |
|---|---|---|---|---|---|---|---|
| (1) | vd1b−vd1a | 27.62 | 27.62 | 38.79 | 38.79 | 42.30 | 49.45 |
| (2) | vd1b−vd1gp | 27.72 | 27.72 | 38.88 | 38.88 | 40.76 | 51.50 |
| (3) | R2g1/f1 | −0.41 | −0.39 | −0.41 | −0.40 | −0.36 | −0.63 |
| (4) | f2gf/f2gr | 0.74 | 0.68 | 0.80 | 0.73 | 0.63 | 0.95 |
| (5) | f1a/f1 | 0.67 | 0.66 | 0.71 | 0.70 | 0.58 | 0.62 |
| (6) | f1b/f1 | 1.54 | 1.58 | 1.59 | 1.76 | 1.16 | 1.40 |

From the above-mentioned data, it can be understood that all the imaging lenses of Examples 1 to 6 are imaging lenses in which Conditional Expressions (1) to (6) are satisfied, the back focus and the entire lens length are short, and various aberrations are satisfactorily corrected. Here, the wording "the back focus is short" means a back focus (air conversion length) equal to or less than 0.7 times the diagonal length of an imaging device which is disposed on the image plane Sim.

Figure 13:
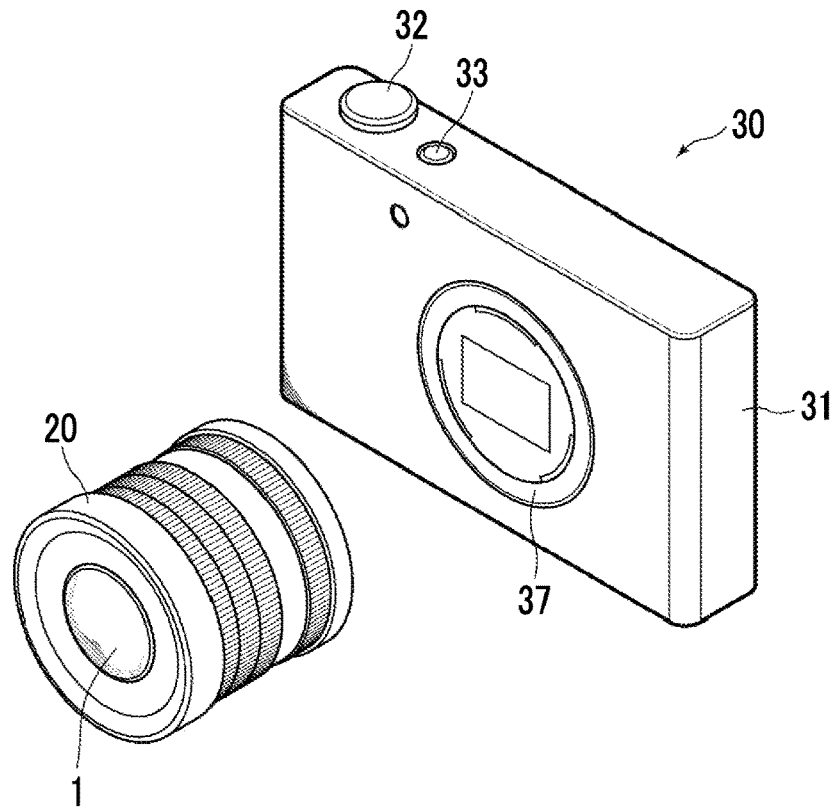
FIG. 13 is a perspective view illustrating a front side of an imaging apparatus according to an embodiment of the present invention.
Figure 14:
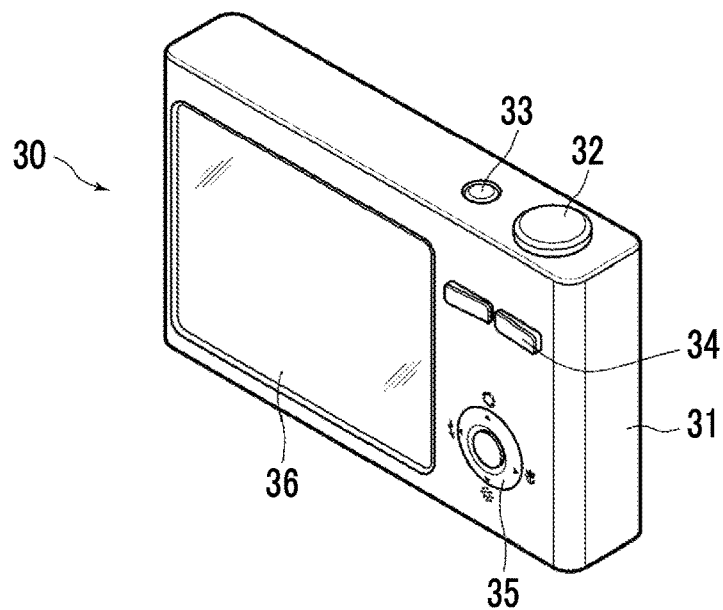
FIG. 14 is a perspective view illustrating a rear surface side of the imaging apparatus of FIG. 13.

Next, an embodiment of an imaging apparatus according to the present invention will be described with reference to FIGS. 13 and 14. A camera 30 showing perspective shapes of a front side and a rear surface side, respectively, in FIGS. 13 and 14 is a non-reflex (so-called mirrorless) type digital camera in which an interchangeable lens 20 having an imaging lens 1 according to an embodiment of the present invention housed within a lens barrel is detachably mounted.

This camera 30 includes a camera body 31, and is provided with a shutter button 32 and a power button 33 on its upper surface. In addition, operating portions 34 and 35 and a display portion 36 are provided on the rear surface of the camera body 31. The display portion 36 is used for displaying a captured image or an image within an angle of view before image capture.

An imaging aperture on which light from an imaging target is incident is provided on the front central portion of the camera body 31, a mount 37 is provided at a position corresponding to the imaging aperture, and the interchangeable lens 20 is mounted onto the camera body 31 through this mount 37.

The camera body 31 is provided therein with an imaging device (not shown) such as a charge coupled device (CCD) that receives a subject image formed by the interchangeable lens 20 and outputs an imaging signal in accordance therewith, a signal processing circuit that processes the imaging signal which is output from the imaging device to generate an image, a recording medium for recording the generated image, and the like. In this camera 30, a still image or a motion picture can be captured by pressing the shutter button 32, and image data obtained by this image capture is recorded in the recording medium.

Hereinbefore, the present invention has been described through embodiments and examples, but the present invention is not limited to the above-described embodiments and examples, and can be variously modified. For example, values such as the curvature radius, the surface spacing, the refractive index, and the Abbe number of each lens are not limited to the values shown in each of the above-described examples, and other values can be used therefor.

In addition, in the embodiment of the imaging apparatus, a non-reflex type digital camera has been described by way of example with reference to the drawings, but the imaging apparatus of the present invention is not limited thereto, and the present invention can also be applied to an imaging apparatus such as, for example, a video camera, a digital camera other than a non-reflex type, a motion-picture camera, or a broadcast camera.

EXPLANATION OF REFERENCES

1: imaging lens
20: interchangeable lens
30: camera
31: camera body
32: shutter button
33: power button
34, 35: operating portion
36: display portion
37: mount
a: on-axis light flux
b: light flux of maximum angle of view
G1: first lens group
G2: second lens group
G3: third lens group
PP: optical member
L1a to L3b: lens
Sim: image plane
St: aperture stop
Z: optical axis

What is claimed is:

1. An imaging lens comprising, in order from an object side:
   a first lens group;
   a second lens group having a positive refractive power; and
   a third lens group, wherein during focusing, the first lens group and the third lens group remain stationary with respect to an image plane, and the second lens group moves in a direction of an optical axis, the first lens group includes a first-a negative lens as an uncemented meniscus lens of which an object side surface is convex, a first-b negative lens of which an image side surface is concave, and a positive lens of which an object side surface is convex, successively in order from a position closest to the object side, a surface of the second lens group closest to the object side has a shape convex toward the object side, the third lens group includes a positive lens at a position closest to the object side, the imaging lens includes exactly three cemented lenses, each of which is consisting of one positive lens and one negative lens, exactly two of the three cemented lenses are included in the second lens group, and the imaging lens is a fixed focal point optical system.

2. The imaging lens according to claim 1,
wherein in a case where an Abbe number of the first-b negative lens in a d line is set to vd1b, and an Abbe number of the first-a negative lens in the d line is set to vd1a, the following Conditional Expression (1) is satisfied:

$$20 < vd1b - vd1a < 56 \tag{1}.$$

3. The imaging lens according to claim 1,
wherein in a case where an Abbe number of the first-b negative lens in a d line is set to vd1b, and an Abbe number of the first-a negative lens in the d line is set to vd1a, the following Conditional Expression (1-1) is satisfied:

$$24 < vd1b - vd1a < 53 \tag{1-1}.$$

4. The imaging lens according to claim 1,
wherein in a case where an Abbe number of the first-b negative lens in a d line is set to vd1b, and an Abbe number of the first-a negative lens in the d line is set to vd1a, the following Conditional Expression (1-4) is satisfied:

$$27.62 \leq vd1b - vd1a < 53 \tag{1-4}.$$

5. The imaging lens according to claim 1, wherein:
a positive lens is disposed closest to an image side in the first lens group, and
in a case where an Abbe number of the first-b negative lens in a d line is set to vd1b, and an Abbe number of the positive lens disposed closest to the image side in the first lens group in the d line is set to vd1gp, the following Conditional Expression (2) is satisfied:

$$20 < vd1b - vd1gp < 58 \tag{2}.$$

6. The imaging lens according to claim 1, wherein:
a positive lens is disposed closest to an image side in the first lens group, and
in a case where an Abbe number of the first-b negative lens in a d line is set to vd1b, and an Abbe number of the positive lens disposed closest to the image side in the first lens group in the d line is set to vd1gp, the following Conditional Expression (2-1) is satisfied:

$$24 < vd1b - vd1gp < 55 \tag{2-1}.$$

7. The imaging lens according to claim 1, wherein:
a positive lens is disposed closest to an image side in the first lens group, and in a case where an Abbe number of the first-b negative lens in a d line is set to vd1b, and an Abbe number of the positive lens disposed closest to the image side in the first lens group in the d line is set to vd1gp, the following Conditional Expression (2-2) is satisfied:

$$27.72 \leq vd1b - vd1gp < 55 \tag{2-2}.$$

8. The imaging lens according to claim 2, wherein:
a positive lens is disposed closest to an image side in the first lens group, and
in a case where an Abbe number of the first-b negative lens in a d line is set to vd1b, and an Abbe number of the positive lens disposed closest to the image side in the first lens group in the d line is set to vd1gp, the following Conditional Expression (2) is satisfied:

$$20 < vd1b - vd1gp < 58 \tag{2}.$$

9. The imaging lens according to claim 2, wherein:
a positive lens is disposed closest to an image side in the first lens group, and
in a case where an Abbe number of the first-b negative lens in a d line is set to vd1b, and an Abbe number of the positive lens disposed closest to the image side in the first lens group in the d line is set to vd1gp, the following Conditional Expression (2-1) is satisfied:

$$24 < vd1b - vd1gp < 55 \tag{2-1}.$$

10. The imaging lens according to claim 2, wherein:
a positive lens is disposed closest to an image side in the first lens group, and
in a case where an Abbe number of the first-b negative lens in a d line is set to vd1b, and an Abbe number of the positive lens disposed closest to the image side in the first lens group in the d line is set to vd1gp, the following Conditional Expression (2-2) is satisfied:

$$27.72 \leq vd1b - vd1gp < 55 \tag{2-2}.$$

11. The imaging lens according to claim 5,
wherein in a case where an Abbe number of the first-b negative lens in a d line is set to vd1b, and an Abbe number of the first-a negative lens in the d line is set to vd1a, the following Conditional Expression (1-1) is satisfied:

$$24 < vd1b - vd1a < 53 \tag{1-1}.$$

12. The imaging lens according to claim 5,
wherein in a case where an Abbe number of the first-b negative lens in a d line is set to vd1b, and an Abbe number of the first-a negative lens in the d line is set to vd1a, the following Conditional Expression (1-4) is satisfied:

$$27.62 \leq vd1b - vd1a < 53 \tag{1-4}.$$

13. The imaging lens according to claim 1,
wherein the second lens group includes a positive lens at a position closest to the object side.

14. The imaging lens according to claim 1,
wherein the second lens group includes a biconvex lens at a position closest to the object side.

15. The imaging lens according to claim 1,
wherein a surface of the third lens group closest to an image side has a shape convex toward the image side.

16. The imaging lens according to claim 1,
wherein the positive lens at the position closest to the object side in the third lens group has a shape convex toward an image side.

17. The imaging lens according to claim 14,
wherein a surface of the third lens group closest to an image side has a shape convex toward the image side.

18. The imaging lens according to claim 17,
wherein the positive lens at the position closest to the object side in the third lens group has a shape convex toward an image side.

19. An imaging apparatus, comprising the imaging lens according to claim 1.

20. The imaging apparatus according to claim 19, comprising an imaging device which is disposed on an image plane of the imaging lens,
wherein a back focus at an air conversion length of the imaging lens is equal to or less than 0.7 times a diagonal length of the imaging device.

* * * * *